United States Patent
El-Zein et al.

(10) Patent No.: US 8,234,604 B2
(45) Date of Patent: Jul. 31, 2012

(54) CO-OPTIMIZATION OF EMBEDDED SYSTEMS UTILIZING SYMBOLIC EXECUTION

(75) Inventors: Ali S El-Zein, Austin, TX (US); Fadi A Zaraket, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 836 days.

(21) Appl. No.: 12/202,500

(22) Filed: Sep. 2, 2008

(65) Prior Publication Data
US 2010/0058256 A1    Mar. 4, 2010

(51) Int. Cl.
*G06F 17/50* (2006.01)
(52) U.S. Cl. ........ 716/100; 716/103; 716/104; 716/106; 716/132
(58) Field of Classification Search .......... 716/100–106, 716/132
See application file for complete search history.

(56) References Cited

U.S. PATENT DOCUMENTS

| | | | |
|---|---|---|---|
| 6,035,124 A | | 3/2000 | Ng |
| 7,596,770 B1 * | | 9/2009 | Kuehlmann et al. .......... 716/106 |
| 2005/0028132 A1 | | 2/2005 | Srinivasamurthy |
| 2008/0040699 A1 * | | 2/2008 | Okada ............................. 716/18 |

OTHER PUBLICATIONS

Fadi Zaraket, John Pape, Adnan Aziz, Magarida Jacome, Sarfraz Khurshid, "Global Optimization of Compositional Systems," FMCAD 07: Proceedings of the Formal Methods in Computer-Aided Design, Nov. 2007, pp. 93-100.

S. Khurshid, C. Pasareanu, and W. Visser, "Generalized symbolic execution for model checking and testing," International Conference on Tools and Algorithms for the Construction and Analysis of Systems, Apr. 2003.

C. Barrett and S. Bezerin, "Cvc lite: A new implementation of the cooperating validity checker," Computer Aided Verification, Apr. 2004.

S. Edwards, L. Lavagno, E. A. Lee, and A. Sangiovanni-Vincentelli, "Design of embedded systems: Formal models, validation, and synthesis," Proc. of the IEEE, vol. 85, 1997.

R. Gerth, D. Peled, M. Y. Vardi, and P. Wolper, "Simple on-the-fly automatic verification of linear temporal logic," International Symposium on Protocol Specification, Testing, and Verification, 1996.

Balarin, Felice et al., "Metropolis: An Integrated Electronic System Design Environment", Computer, IEEE Computer Society, Apr. 2003, vol. 36, Issue 4, pp. 45-52.

Balarin, Felice et al., "Modeling and Designing Heterogeneous Systems", Cadence Berkeley Labs, Nov. 2001, University of California, Berkeley, CA, 47 pages.

(Continued)

*Primary Examiner* — Paul Dinh
(74) *Attorney, Agent, or Firm* — Stephen R. Tkacs; Stephen J. Walder, Jr.; Diana R. Gerhardt

(57) ABSTRACT

Co-Optimization utilizing Symbolic Execution (COSE) works across components of an embedded design to optimize structures therein. COSE utilizes symbolic execution (SE) to analyze software components and defines a limited set of values that software feeds hardware as constraints. SE explores substantially all possible paths of execution of the code specifying a component. It accomplishes this by accumulating path conditions (PCs) and annotating them to the corresponding segments of the component. A PC is associated with a branch of code and consists of the conjunction of conditions over input and state variables necessary and sufficient for the branch to execute. These PCs define constraints that limit the set of values that software feeds hardware. These constraints are then propagated across the networks of the design and employ static analysis techniques such as constant propagation, redundancy removal, and don't care optimizations to reduce the hardware components.

20 Claims, 10 Drawing Sheets

OTHER PUBLICATIONS

Bjesse, Per et al., "SAT-Based Verification without State Space Traversal", Formal Methods in Computer-Aided Design, Lecture Notes in Computer Science, 2000, vol. 1954/2000, DOI: 10.1007/3-540-40922-X_23, pp. 409-426.

Bringmann, Oliver et al., "Conflict analysis in multiprocess synthesis for optimized system integration", Proceedings of the 3rd IEEE/ACM/IFIP International Conference on Hardware/Software Codesign and System Synthesis, Codes+ISSS 2005, Jersey City, NJ, Sep. 19-21, 2005, pp. 15-20.

Chiodo, Massimiliano, "Optimization and Synthesis for Complex Reactive Embedded Systems by Incremental Collapsing", Proceedings of the Tenth International Symposium on Hardware/Software Codesign, Codes 2002, Estes Park, CO, May 6, 2002-May 8, 2002, pp. 115-120.

Chiodo, Massimiliano et al., "Synthesis of Mixed Software-Hardware Implementations from CFSM Specifications", International Workshop on Hardware-Software Codesign, Jun. 1, 1993, 65 pages.

Chiodo, Massimiliano et al., "Synthesis of Software Programs for Embedded Control Applications", 32nd Conference on Design Automation, San Francisco, CA, DAC '95, 1995, pp. 587-592.

King, James C., "Symbolic Execution and Program Testing", Communications of the ACM, Jul. 1976, vol. 19, No. 7, pp. 385-394.

Mony, Hari et al., "Scalable Automated Verification via Expert-System Guided Transformations", Formal Methods in Computer-Aided Design (FMCAD 2004), Austin, Texas, Nov. 14-17, 2004, pp. 159-173.

Roop, Partha S. et al., "k-time Forced Simulation: A Formal Verification Technique for IP Reuse", IEEE International Conference on Computer Design (ICCD '02), Freiburg, Germany, Sep. 16-18, 2002, 8 pages.

Sentovich, Ellen M. et al., "SIS: A System for Sequential Circuit Synthesis", Department of Electrical Engineering and Computer Science, University of California, Berkeley, CA, May 4, 1992, 45 pages.

\* cited by examiner

```
public netlist oid_netlist{
  static final int RESOL = 50;
  ...
  public oid_netlist(String name, int res, int sel, int sense, int neighboors)
  {
    OIDEdgeGaussian edge1 = new OIDEdgeGaussian(RESOL, SELECT);
    OIDEdgeGaussian edge2 = new OIDEdgeGaussian(2*RESOL, SELECT);
    OIDEdgeGaussian edge3 = new OIDEdgeGaussian(3*RESOL, 2*SELECT);
    OIDEdgeGaussian edge4 = new OIDEdgeGaussian(4*RESOL, 2*SELECT);
    ...
    OIDFusion fuse = new OIDFusion(REQ_EDG, REQ_SEG);
    //connect edge - fuse
    connect(edge1, oid_fusion_ifc, fuse);
    connect(edge2, oid_fusion_ifc, fuse);
    connect(edge3, oid_fusion_ifc, fuse);
    connect(edge4, oid_fusion_ifc, fuse);
  }
}//end of netlist
```

```
medium OIDFusion implements FusionControllerIfc {
  ...
  eval int resolution() {
    return max(oid_rec_ifc.res(), oid_cap_ifc.res()); } } process OIDEdgeGaussian extends OIDEdge
{
  parameter int resolution;
  ...
  int m_state = no_op;
  thread() {
    if(m_state == no op)
      while(oid_fusion_ifc.resolution() < resolution &&
            oid_fusion_ifc.selection() < selectiveness &&
            oid_fusion_ifc.goodtime()){
        m_state = mask_on;
        int pixels[][] = oid_iem_ifc.refImage();
        int marks[][] = oid_iem_ifc.refEdge();
        doGaussianMark(pixels, marks, m_state);}
      else
        doGaussianMark(oid_iem_ifc.image(), oid_iem_ifc.edgeMarks());
    ...}
```

FIG. 10

CO-OPTIMIZATION OF EMBEDDED SYSTEMS UTILIZING SYMBOLIC EXECUTION

FIELD OF THE INVENTION

The present invention is generally related to computer-aided design, and, more particularly, is related to a system and method for co-optimization of embedded systems utilizing symbolic execution.

BACKGROUND OF THE INVENTION

Embedded systems typically consist of a composition of a set of hardware and software modules. An embedded system performs one or more dedicated tasks using one or more processors that communicate with other dedicated devices, without being referred to as a computer. Embedded systems arise in many applications: examples include communication, image processing, and automotive electronics.

Embedded systems are heterogeneous by nature. For example, they combine application specific integrated circuits (ASICs) and field programmable gate arrays (FPGAs) with embedded software. A diversity of platforms attempt to employ and integrate different models of computation (MoC) to address the co-design problem of embedded systems. These platforms need to provide tools to specify, synthesize, and validate an embedded system.

One example of a design tool for embedded systems is Metropolis. A designer specifies the system utilizing the Metropolis Metamodel (MMM) and Metropolis synthesizes the design by configuring parameterized architectural elements, dynamic scheduling algorithms, interface blocks, as well as final software and hardware implementation. For a more detailed description of the Metropolis design environment, see "Metropolis: Design Environment for Heterogeneous Systems," available: http://www.gigascale.org/metropolis/. Many techniques exist to optimize each of these components as well as the underlying communication network. However, there is a need for new techniques, that can perform optimization across hierarchical boundaries.

SUMMARY OF THE INVENTION

The present invention discloses Co-Optimization utilizing Symbolic Execution (COSE), a novel technique that works across components of an embedded design to optimize structures therein. COSE automatically detects opportunities for optimization thereby avoiding labor on the part of a designer who would otherwise have to manually select the subset of functionality used. COSE detects invariants that the designer may not know or may not recognize as useful for optimizing other components. Furthermore, unlike a designer manually simplifying components using knowledge of his or her environments, the present invention utilizes a formal technique to compute opportunities for optimization, thereby ensuring that the optimized and original designs are functionally equivalent.

Fundamental to the present invention's approach is symbolic execution (SE). The present invention utilizes SE to analyze software components and defines a limited set of values that software feeds hardware as constraints. SE explores substantially all possible paths of execution of the code specifying a component. It accomplishes this by accumulating path conditions (PCs) and annotating them to the corresponding segments of the component. A PC is associated with a branch of code and consists of the conjunction of conditions over input and state variables necessary and sufficient for the branch to execute. These PCs define constraints that limit the set of values that software feeds hardware. These constraints are then propagated across the networks of the design and employ static analysis techniques such as constant propagation, redundancy removal, and don't care optimizations to reduce the hardware components.

SE performs particularly well in the context of simple inequality checks and mapping assignments. This makes it suitable for detecting invariants that arises from different configurations and parameterizations of hardware components in software. In one advantageous embodiment, COSE applies Juzi, an SE tool, to extract PCs for every line of code in an MMM component. Juzi is described in S. Khurshid, C. Pasareanu, and W. Visser, "Generalized symbolic execution for model checking and testing," International Conference on Tools and Algorithms for the. Construction and Analysis of Systems, April 2003, which is incorporate herein by reference. Juzi uses CVC-lite to solve or simplify PCs. CVC-Lite is a theorem prover for the Satisfiability. Modulo Theory problem and it operates on logics that can express equality, inequality, and arithmetic operations. For a better understanding of CVC-Lite, see C. Barrett and S. Bezerin, "Cvc lite: A new implementation of the cooperating validity checker," in Computer Aided Verification, April 2004, which is incorporate herein by reference.

BRIEF DESCRIPTION OF THE DRAWINGS

For a more complete understanding of the present invention, reference is now made to the following descriptions taken in conjunction with the accompanying drawings, in which:

FIG. 10 illustrates an exemplary code listing for the ObjectID netlist, OIDFusion medium, and OIDGaussianEdge process and their dependency map.

DETAILED DESCRIPTION OF THE PREFERRED EMBODIMENT

Figure 1:
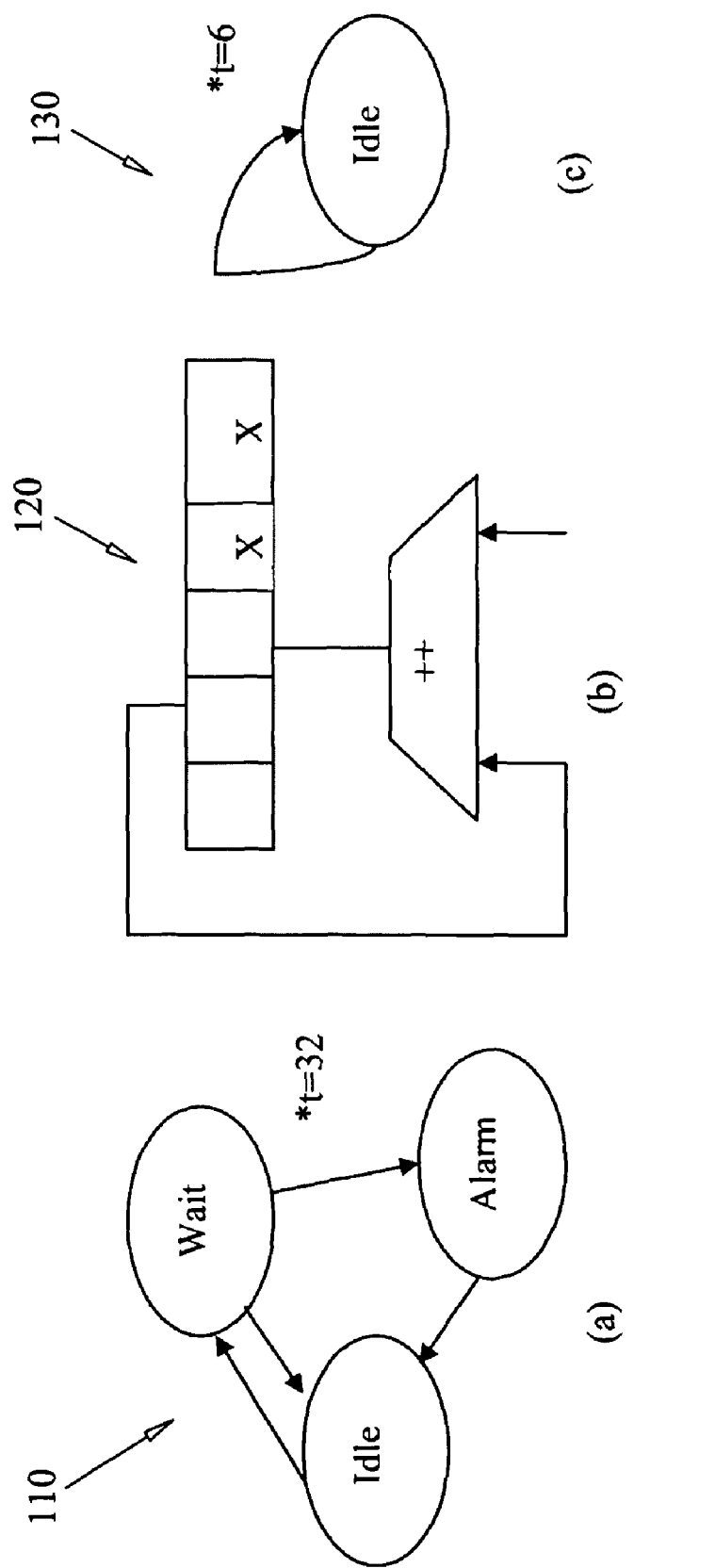
FIG. 1 illustrates a seat belt controller design scenario.

Referring initially to FIG. 1, illustrated is an exemplary seat belt controller design scenario. A state diagram 110 depicted in FIG. 1(a) describes the seat belt controller. The controller waits for at most 32 seconds after a car key is inserted and turned on for the seat belt to be locked. If the seat belt is not locked, the alarm will then be turned on. A counter 120 is shown in FIG. 1(*b*) that implements the timer. Since the timer counts until 32, a minimum of 5 state bits are needed in the hardware implementation of counter 120. Now suppose that a car manufacturer decides to add a new safety feature and a designer implements it in a new component 130 as shown in FIG. 1(*c*). The new component 130 monitors the same timer signal and forces the car to turn off if the seat belt was not locked before 6 seconds have elapsed. All that is needed to count for now is 6 and therefore only a counter with 3 state bits is required. It should be noted that the potential for this reduction can only be recognized when the design is co-optimized.

The above described phenomenon is routinely faced in embedded system design. Other examples include bus controllers with preemptive logic used in non-preemptive applications, cache internet protocol (IP) that has pollution logic employed in an application that never invalidates the data, an Internet Protocol processor that supports IPv6 used in a router that drops all IPv6 packets at the ingress, a microprocessor core that supports multiplication used in an application that is purely control dominated, etc.

Figure 2:
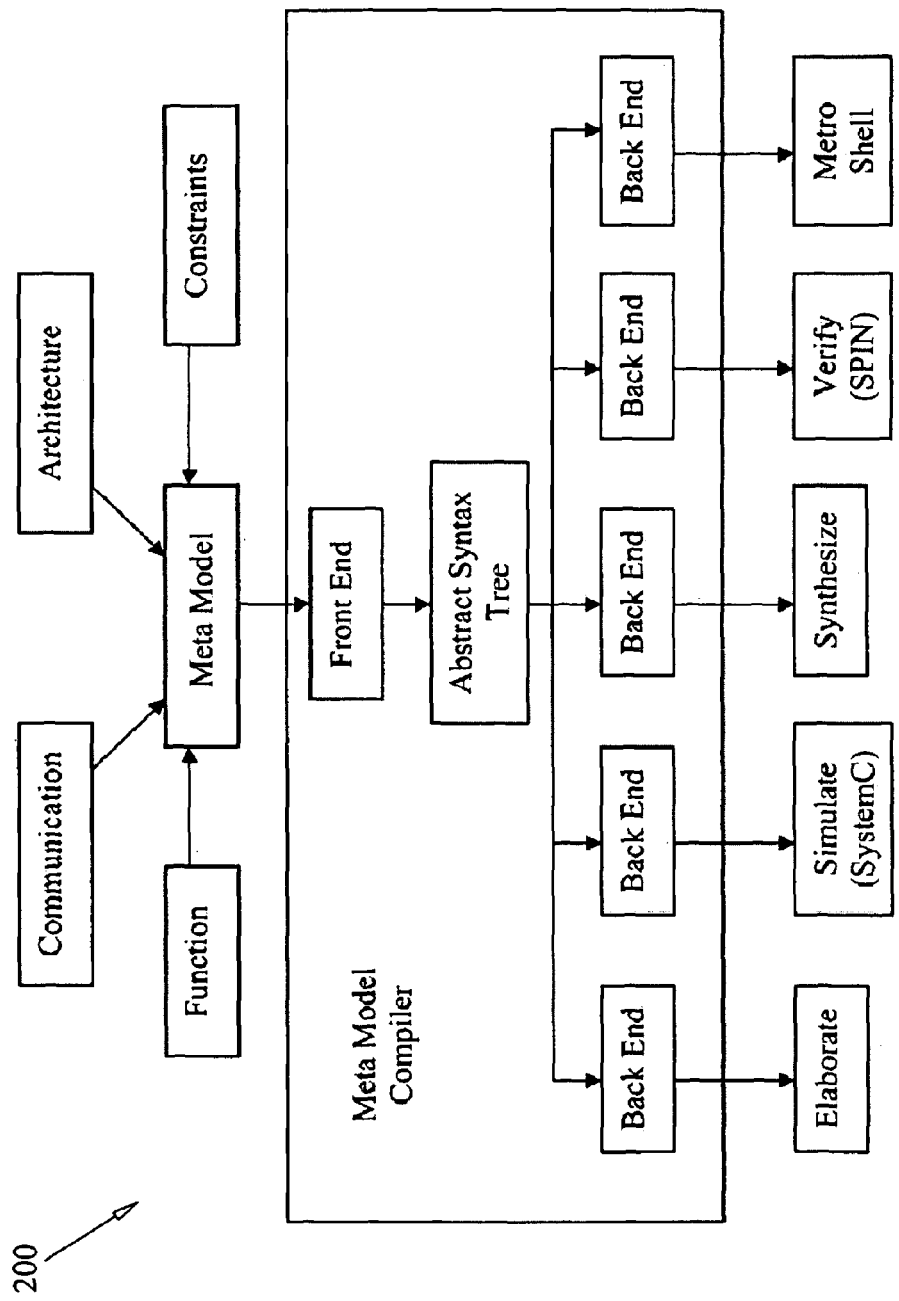
FIG. 2 illustrates an exemplary block representation of a Metropolis platform.

Turning now to FIG. 2, there is illustrated an exemplary block representation of a Metropolis platform 200. Metropolis provides a framework that integrates a set of tools to operate and manipulate a common design representation. Metropolis provides a metamodel to support existing models of computation and accommodate new ones. Similar to other design platforms like Polis, Ptolemy, SystemC, and SpecC, Metropolis allows concurrent design of multiple processes and uses channels to communicate between them. However, Metropolis is different in that it introduces orthogonalities between (1) computation versus communication, (2) functionality versus architecture, and (3) behavior versus performance. These processes are orthogonal since computation refinement is usually a manual process, functional and architectural specifications are decided by different groups, and performance constraints are specified by a group other than the behavior designers. The tools integrated in Metropolis allow designers to specify, partition, synthesize, and validate an embedded system. Partition is meant to decide which parts of a design get, implemented, by software that runs on programmable components and which parts get implemented directly in dedicated hardware devices. Synthesis compiles software to optimized object code and hardware into optimized configurations of logic gate libraries. Validation checks whether the final implementation meets the properties defined in the specifications of the design. Metropolis employs MMM, an extension of the Java programming language with access restriction paradigms, as the design description language.

Metropolis platform 200 illustrates the different components of the Metropolis platform and provides several tools to manipulate a design. The two most commonly utilized tools are the Elaborator and the SystemC code generator. The Elaborator parses the MMM specifications and generates an abstract syntax tree (AST). All the other tools in the Metropolis framework operate on the AST. The SystemC generator provides a path to simulation, verification, and synthesis. Metropolis also has another verification path to the SPIN model checker.

Metropolis Design Methodology: Metropolis allows a recursive design cycle with three phases. In Phase 1, a designer specifies the functional behavior of the design. This utilizes one or more MoC to describe (1) the computation components, (2) the communication components, (3) the connections, and (4) the hierarchy of the design. In MMM, these are referred to as processes, media, interfaces and netlists respectively. In Phase 2, the designer describes the target architecture platform of the design as a library of services. In Phase 3, the designer maps the functional specifications to the architecture services. In summary, the mapping is an intersection operation that constrains a functional interface to an architectural one. The functional and architectural netlists may be developed by Metropolis designers and may also be provided as libraries. A platform vendor, for instance, may provide an architecture MMM of an FPGA to its customers. Similarly, a design team may develop a standard library of commonly used functional processes to promote reuse.

The Meta Model: Metropolis utilizes a meta model to represent a design. Similar to the tagged-signal model, MMM is not tied to a particular MoC. For a discussion of the tagged-signal model, see S. Edwards, L. Lavagno, E. A. Lee, and A. Sangiovanni-Vincentelli, "Design of embedded systems: Formal models, validation, and synthesis," Proc. of the IEEE, vol. 85, 1997, which is incorporated herein by reference. MMM provides a set of computation and communication building blocks that can be customized to describe the semantics of many different MoCs thus enabling the modeling of heterogeneous systems. MMM builds on the syntax and semantics of the Java programming language and it restricts itself to a subset of Java that includes inheritance, basic logical and arithmetic operators, loops, and conditionals. MMM introduces special class specifiers such as process, media, and quantity and supports method and field access control using modifiers like eval, update, and port. It also supports logical implication and equivalence operators in its embedded linear temporal logic (LTL) used to specify constraints. See R. Gerth, D. Peled, M. Y. Vardi, and P. Wolper, "Simple on-the-fly automatic verification of linear temporal logic," in International Symposium on Protocol Specification, Testing, and Verification, 1996, which is herein incorporated by reference.

Processes are the active elements of the design and are typically used to perform computations via executing their thread methods. To decouple communication from computation, processes do not communicate directly with each other, they connect through interface ports and media. This allows the communication semantics to change without the need to change the processes. Media are the communication components of the design and facilitate communication between processes, and other media. They are passive, meaning they do not perform computation, but they may contain data and state.

The Metamodel supports two constraint formula types; LTL and logic of constraints (LOC). In addition, often LTL constraints form mappings expressing the equivalence between functional and architectural components. A netlist connects the Metamodel components. Functional netlists usually consist of processes and media, while architectural netlists consist of processes, media, quantities, and constraints. Netlists may be connected hierarchically and a mapping netlist, for example, can contain a functional netlist, an architectural netlist, and constraints between the two.

Figure 3:
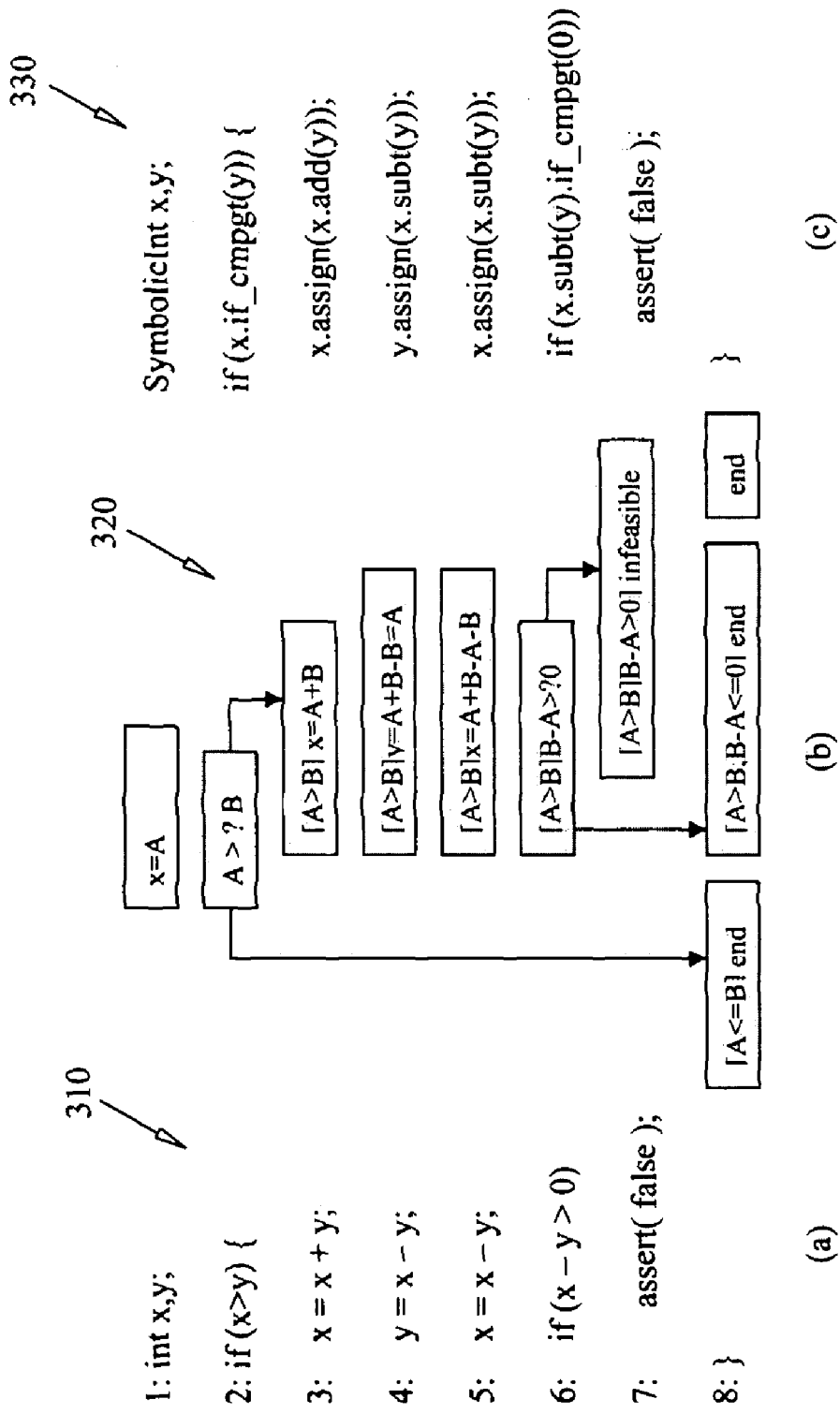
FIG. 3 illustrates an exemplary implementation and execution of a generic program code utilizing Symbolic Execution.

Turning now to FIG. 3, there is illustrated an exemplary implementation and execution of a generic program code utilizing Symbolic Execution. Symbolic Execution (SE) is a technique that explores all possible executions of a program by traversing all possible branching conditions while bookkeeping symbolic values for all variables involved in the program at each atomic step. For every branch, SE adds the condition for the branch it takes to a PC in conjunction. Upon completion, all PCs are evaluated. Some of the accumulated PCs may be proved unsatisfiable, and therefore the code that these PCs annotate is proved dead since there is no setting for the program variables that satisfies its PC.

FIG. 3(b) depicts symbolic execution 320 of an original generic code 310 shown in FIG. 3(a). SE 320 techniques begins by initializing variables x and y to symbolic values A and B. At the first branch on line 2, the two choices are valid so they are both considered. The first, A≦B, exits the block. The second, A>B, enters the body of the conditional statement. The values of x and y are updated at each line until the next branch is reached on line 6. At that point, the first condition, B−A≦0, exits the block and the second condition, B−A>0, leads to the assert statement. However the PC, accumulated from the branch on line 2, conflicts with the symbolic check on the values of x and y. Therefore, it can be concluded that the assert statement is not accessible.

The above illustrates how the SE technique can effectively detect dead code in control and data flow dominated circuits. Utilizing SE, each line of code can also be annotated with all the PCs that allow the line to be executed. The tool Juzi implements SE for Java code and does so by instrumenting the Java-byte code of the Java class in question to use symbolic implementations for its variables. FIG. 3(c) shows the Java code 330 equivalent to the automatic Juzi instrumentation for the generic code 310 shown in FIG. 3(a). The variables x and y are declared as SymbolicInt variables and the arithmetic and Boolean operations and conditions applied to them are replaced by symbolic operations. The symbolic assign, add, and subt operations update the correspondence between x and y and the symbolic values A and B respectively. The if cmpgt updates and checks the PC with the different choices it makes. Juzi also introduces lazy initialization where it initializes a variable only when it is actually used rather than when it is declared. Juzi supports dynamically allocated structures and data structures with self-loops, e.g., linked lists, and respects method preconditions.

Juzi utilizes CVC-lite to decide a PC or to simplify it into an equivalent more compact PC. CVC-lite is a validity checker for typed first order logic with interpreted theories. It supports integer and real arithmetic, equality and inequalities, predicate subtypes, partial functions, uninterpreted functions, arrays, records, bitvectors, and quantifiers. The present invention leverages these capabilities to work on a high level of abstraction and detect invariants that are qualitatively different than those detected at the Boolean level.

Figure 4:
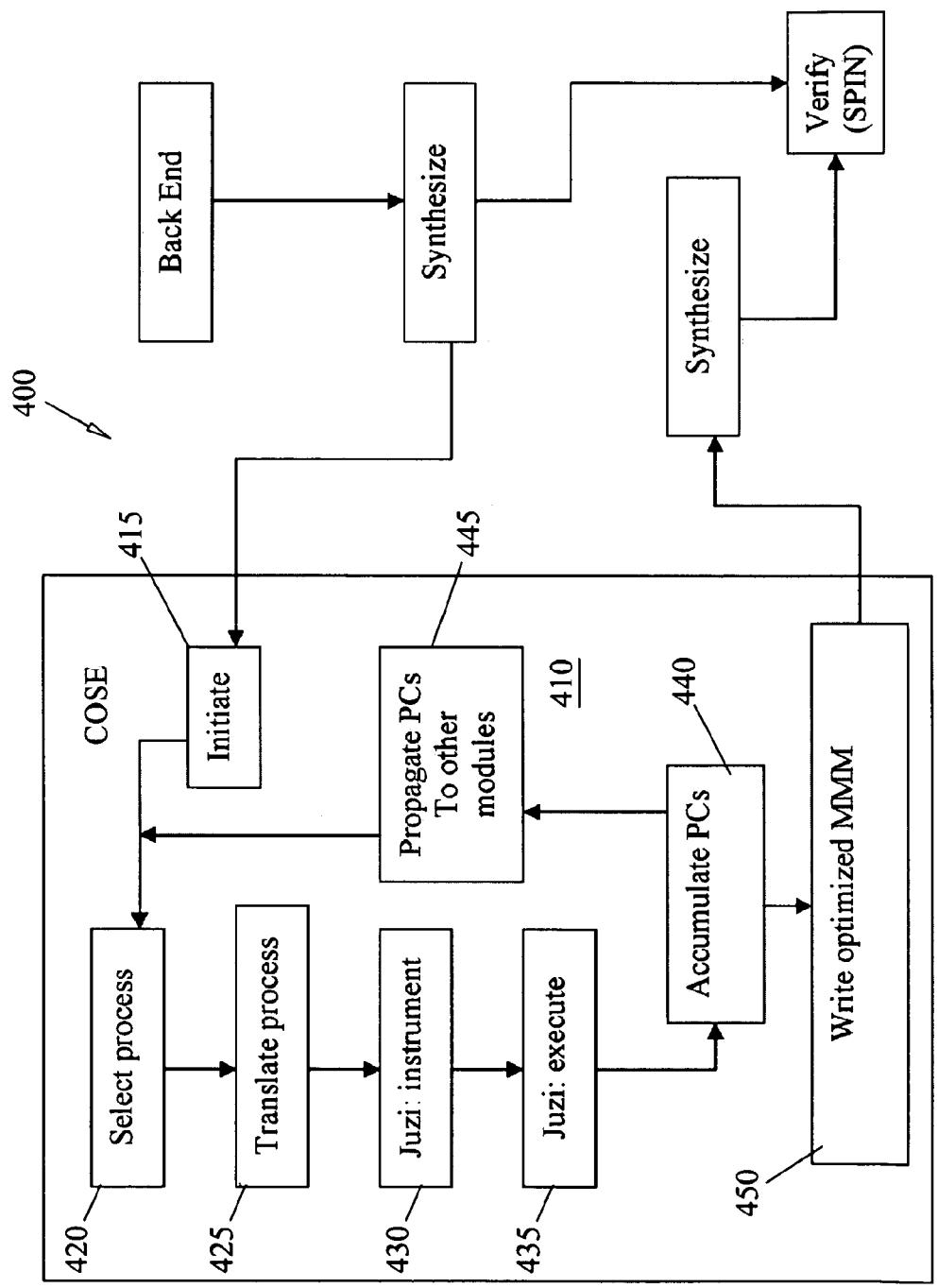
FIG. 4 illustrates a process flow diagram of an embodiment of Co-Optimization utilizing Symbolic Execution (COSE) integrated into the Metropolis framework described previously in FIG. 2.

Turning now to FIG. 4, illustrated is a process flow 410 diagram of an embodiment of Co-Optimization utilizing Symbolic Execution (COSE) integrated into the Metropolis framework 400 described hereinabove in conjunction with FIG. 2. COSE is an iterative process that uses SE and static analysis techniques to optimize a design at hand. The COSE process flow 410 is initiated when an initiation module 415 takes as an input a MMM netlist Φ and a starting PC σ that could be empty. Following which, at a selection module 420, COSE selects one interesting process Π in the netlist Φ and utilizes Juzi, in one advantageous embodiment, to symbolically execute the thread function in the process Π, beginning with σ as the starting PC. COSE advantageously utilizes Juzi and CVC-lite to perform SE because MMM is an extension to Java with access restrictions.

Next, at a translation module 425, COSE translates the process Π to Java and names it ΠJava. It should be noted that the translation to Java is straightforward and works with inlining method calls and substituting ports by variables with Boolean validity guards to control read and write operations and allow a run-time protection mechanism. The translated process ΠJava is subsequently complied, at an instrument module 430, into byte-code ΠBC and fed to the Juzi instrumentor class. Following which, at an execution module 435, COSE proceeds to symbolically execute the instrumented class and the generated PCs are gathered at an accumulation module 440. COSE follows the usage of ports in the process 410 and joins all the path conditions annotated to the code of the ports in disjunction into aport i. Following which, at a propagation module 445, each aport i is treated as a constraint to the port and is propagated through the corresponding connections in the netlist Φ. COSE repeats the process modules 415 through 445 for every medium and process that connects to the process Π through a constrained port.

Concurrently with the propagation of σport i through the corresponding connections in the netlist Φ, at an optimizing module 450, each line of MMM code is annotated with the disjunction of the PCs generated for it from Juzi. The PCs are resolved and compacted utilizing CVC-lite. A PC that evaluates to false is infeasible and the corresponding code that it annotates is "dead-code" and therefore can be optimized away. COSE can also perform range restriction optimizations. For example, if COSE detects PCs restricting all indexes reading and writing into an array to a specific range, it can resize the array and use a smaller number of bits for the indexes. COSE also checks for mutually exclusive blocks of code via evaluating the PCs of interesting blocks of code that use the same ports. Once two mutually exclusive blocks of code are detected, COSE adds a constraint to the netlist connecting the two blocks of code to declare that they are mutually exclusive. Synthesis tools can utilize this to optimize communication between ports depending on the underlying MoC. COSE generates optimized MMM modules that are annotated with detected and simplified PCs. In addition to conditional statements, COSE embeds the PCs detected on ports as LTL constraints in the MMM module describing the netlist connections of the design.

The optimized and constrained MMM are then passed to a synthesis tool where target reductions are achieved utilizing static analysis techniques such as constant propagation, redundancy removal, and observability don't care optimizations. COSE operates only on the MMM level and it utilizes the netlist connecting the different components of a design only to follow the connections regardless of the semantics of the underlying MoC. Thus the optimizations and constraints computed by COSE are valid regardless of the underlying MoC.

Dependency Map and Constraint Propagation: COSE propagates constraints through ports. A port has an interface type and allows access to methods declared in the interface. More than one process may own ports with the same interface type and media implements the interface methods. COSE follows the port declarations and usages in the entire netlist Φ and forms a dependency graph. The nodes of the dependency graph are processes, media, and interfaces. All the connections in MMM are done with the connect keyword which facilitates building such a map. Connections in MMM have to be resolved statically and are done at the netlist level. This helps run SE on the component level only and helps COSE scale to large compositions. A PC is coded into a conditional constraint and is annotated either to the thread method of a process, or to the implementation of an interface method in a media.

Synthesis Reduction Techniques: COSE can employ the native synthesis tools in Metropolis or it can run public domain synthesis optimization tools, for example, SIS (A System for Sequential Circuit Synthesis) to optimize the components with the computed constraints. The best optimization gains are realized when COSE detects dead code that instantiates or activates other components of the netlist. Constraint based optimizations intersect with sequential don't care reductions. As previously stated, COSE has the advantage of detecting invariants on a level of abstraction higher than classical don't care optimization techniques which employs Boolean constraints. This is mainly because COSE utilizes SE which produces PC expressed with equality, inequality and arithmetic logic.

Seat Belt Example: For the modified seat belt example described previously in conjunction with FIG. 1, in a single iteration COSE propagated a PC that constrains the counter port to $\leqq 6$ in the timer. If the timer is implemented in hardware, this is enough to set the two most significant state bits of the counter to 0. Constant propagation techniques can propagate the 0 values and drop the constant state bits.

The process flow and block diagrams in FIG. 4 above illustrate the architecture, functionality, and operation of possible implementations of systems, methods and computer program products according to the present invention. In this regard, each block in the flowchart or block diagrams may represent a module, segment, or portion of code, which comprises one or more executable instructions for implementing the specified logical function(s) described. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or process flow illustration, and combinations of blocks in the block diagrams and/or process flow illustration, can be implemented by special purpose hardware-based systems that perform the specified functions or acts, or combinations of special purpose hardware and computer instructions.

Figure 5:
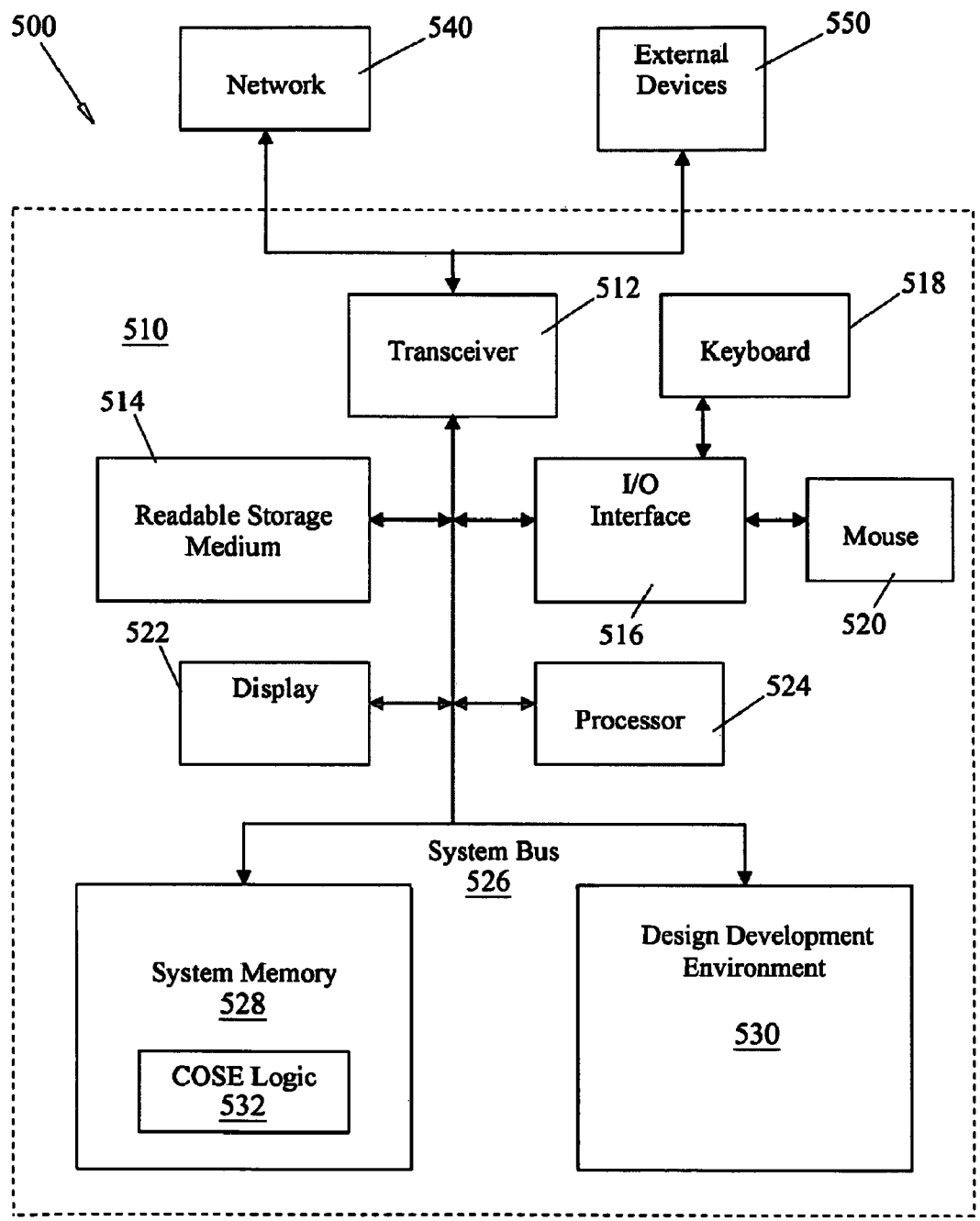
FIG. 5 illustrates a block diagram of an exemplary data processing system that provides a suitable environment in which the present invention may be implemented.

Referring now to FIG. 5, there is depicted a block diagram of an exemplary data processing system 500 that provides a suitable environment in which the present invention may be implemented. Data processing system 500 includes a computer 510, which in turn, includes a processor 524 that is coupled to a system bus 526. A transceiver 512, connected to the system bus 526, enables the computer 510 to connect to a network 540 and to a plurality of external devices 550*a-n* via wired or wireless mechanisms. A display 522, coupled to the system bus 526, allows for presentation of a general user interface (including text and graphics) for use by a user of the computer 510. The system bus 526 also affords communication with a hardware-based readable storage medium 514 (e.g., Compact Disk-Read Only Memory (CD-ROM), flash drive memory, etc). An Input/Output (I/O) Interface 516, also connected to the system bus 526, permits user interaction with the computer 510, such as data entry via a keyboard 518 or a mouse 520.

As shown, the computer 510 also comprises a system memory 528. The system memory 528 also comprises a COSE logic module 532 for autonomously executing the disclosed methodology of co-optimization embedded systems utilizing symbolic execution based on the principles disclosed by the present invention. The COSE logic module 532 includes code for implementing the processes described hereinabove in conjunction with FIG. 4. The computer 510 also comprises a design development environment 530, such as the Metropolis design platform, coupled to the system bus 526 that comprises a design synthesis tool.

As illustrated and described herein, the computer 510 may be a computer system or server having the required hardware components and programmed with COSE logic module 532 executing on the processor to provide the functionality of the disclosed invention. However, in other advantageous embodiments, the computer 510 may also be a device that is specifically designed to include the functionality of the COSE logic module 532, as described herein. The hardware elements depicted in the computer 510 are not intended to be exhaustive, but rather are representative to highlight components required by and/or utilized to implement the present invention. For instance, the computer 510 may include alternate, memory storage devices such as magnetic cassettes, Digital Versatile Disks (DVDs), Bernoulli cartridges, and the like. These alternate configurations of components and other variations are intended to be within the spirit and scope of the present invention.

Embodiments within the scope of the present invention also include computer-readable media for carrying or having computer-executable: instructions or data structures stored thereon. Such computer-readable media can be any available media that can be accessed by a general purpose or special purpose computer. By way of example, and not limitation, such computer-readable media can comprise physical (or recordable type) computer-readable media including RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. Additionally, when information is transferred or provided over a network or another communications connection (either hardwired, wireless, or a combination of hardwired or wireless) to a computer, the computer properly views the connection as a computer-readable medium. Thus, any such connection is also properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the present invention has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Figure 6:
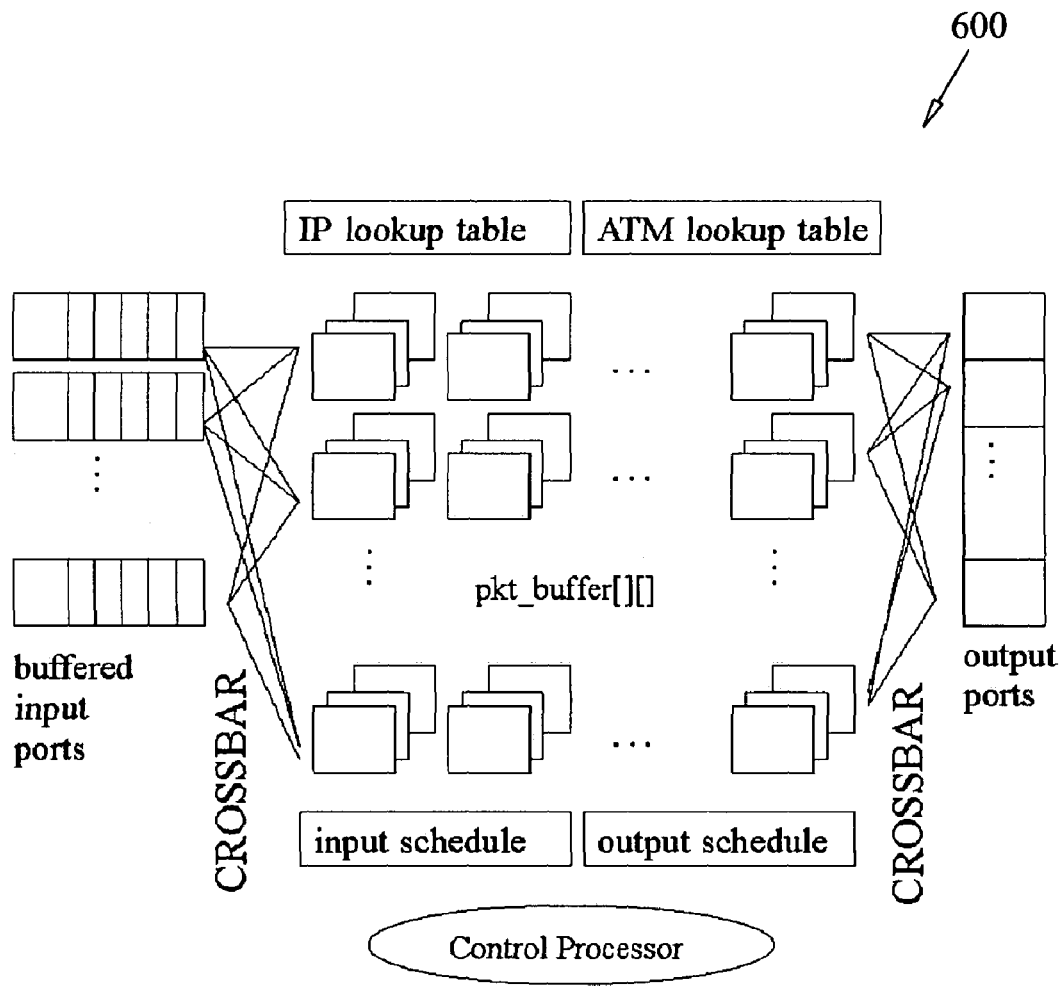
FIG. 6 illustrates an embodiment of an organization of a shared-memory switch fabric design for mixed IP and ATM traffic that provides an advantageous environment for the practice of the present invention.

Turning now to FIG. 6, illustrated is an embodiment of an organization of a shared-memory switch fabric design 600 for mixed IP and ATM traffic that provides an advantageous environment for the practice of the present invention. The switch fabric design 600 receives packets of data on its input ports and correctly forwards them to their destination ports. A packet can be described as a data structure composed of a protocol field, a class field, a destination address and a payload stream of data. Input ports are modeled by queued buffers of packets and output ports are assumed to hold the data for immediate consumption. When two packets arrive which need to be forwarded to the same output port, one is stored in the packet buffer. Pooling the packet memory leads to better buffer utilization and high-end core routers, such as the Juniper M-series, are organized in this fashion.

The switch fabric design 600 supports both IP and ATM traffic and it implements class-of-service: each packet has a class-of-service field which identifies its priority. The control processor computes two schedules, taking into account the free packet buffers. The input schedule maps input ports to available packet buffers, and the output schedule maps valid packet buffers to output ports. The physical transfer of packets is performed via the crossbars after the schedule is computed. The design is configured using in-band signaling, through IP and ATM packets specially marked with a control code in the first byte of the packet payload. A control packet contains a destination and a port number and instructs the switch fabric node to update the forwarding table to map the destination to the output port. The switch fabric design 600 implements this via two lookup tables for the protocols it supports. The lookup tables are used later to map data packets with destination addresses to the correct ports.

Figure 7:
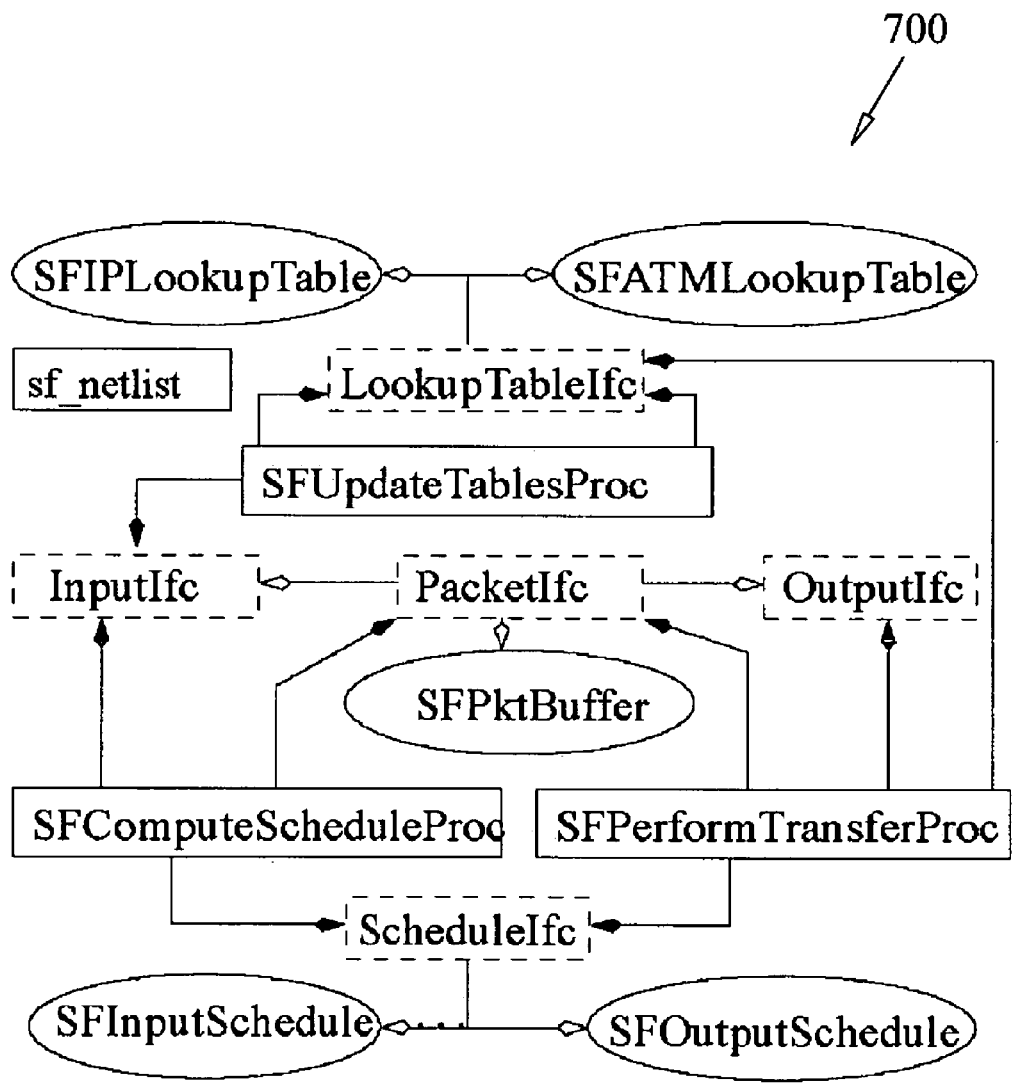
FIG. 7 illustrates a Metropolis Metamodel (MMM) class diagram of the switch fabric design depicted in FIG. 6.

Referring now to FIG. 7, with continuing reference to FIG. 6, there is depicted a Metropolis Metamodel (MMM) class diagram 700 of the switch fabric design 600. For ease of explanation, boxes denote process classes, dotted boxes denote interfaces, ellipses show media classes, and filled and empty arrows denote ownership and inheritance relations respectively. The design is connected through the netlist object sf netlist. The input and output schedules are media objects that implement the ScheduleIfc interface. The IP and ATM lookup tables are media objects that implement the LookupTableIfc interface. The internal memory is a two dimensional array of the SFPktBuffer media which implements the PacketIfc interface. The sf netlist has input and output port interfaces that also implement the PacketIfc interface. The computational elements of the switch fabric design 600 are expressed in three processes. The SFUpdateTablesProc process receives control input packets and updates the lookup tables. The second process SFComputeScheduleProc looks at the input and output ports and the internal memory through PacketIfc and updates the input and output schedules. SFPerformTransferProc is the third process and it actually reads the schedules and performs the data transfer accordingly.

Results for Switch Fabric: The deployment of the switch fabric design 600 depicted in FIG. 6 is assumed in multiple scenarios. The first scenario is with network elements that produce. IP only traffic and the second scenario is with local network elements that are limited to the use of few output ports. The IP-only traffic is modelled by a CreateInputs process. The following fragment of pseudo code, listed below in Table 1, from CreateInputs illustrates how the protocol field is set to IP PROTOCOL for valid inputs.

TABLE 1

```
int inIdx;
for ( inIdx = 0 ; inIdx < NUM_IN; inIdx++ ) {
    inBuff[inIdx].valid = chooseBoolean( );
    if(inBuff[inIdx].valid == 1){
    // if (chooseBoolean( ) == 1)
    inBuff[inIdx].pkt.protocol = IP_PROTOCOL;
    //else
    // inBuff[inIdx].pkt.protocol = ATM_PROTOCOL;
    ... }
```

Similar to the illustration in FIG. 3, COSE instruments all fields of the pkt as SymbolicInt and thus detects the path condition PCprtcl, inBuff[inIdx].protocol=IP PROTOCOL, in all execution branches of the CreateInputs process. COSE propagates PCprtcl to SFComputeSchedule through the InputIfc ports and was able to determine that all blocks of code conditioned, with if(inBuff[inIdx].protocol=ATM PROTOCOL) are infeasible in all branches of execution of SFComputeSchedule. COSE annotates all these blocks of code with an if(false) PC and thus optimizes them out. Additionally, COSE annotated the PacketIfc and the ScheduleIfc interfaces with PCprtcl since it still holds across all execution branches in SFComputeSchedule. Subsequently, COSE propagated the PCprtcl to the SFPerformTransferProc process. All blocks of code therein conditioned with if(inBuff[inIdx].protocol=ATM PROTOCOL) were optimized out.

Next, the network is modelled with limited output port accessibility with a CreateInputs process that sends control packets with a limited destination port value. See, for example, the pseudo code listed below in Table 2.

TABLE 2

```
int inIdx;
for(inIdx = 0; i < NUM_IN; i++){
    inBuff[inIdx].valid = chooseBoolean( );
    if(inBuff[inIdx].valid == 1){
        int choiceDataVsControl = chooseBoolean( );
        if(choiceDataVsCntrl == 1){
            inBuff[inIdx].pkt.data[0] = CTRL_PKT;
            inBuff[inIdx].pkt.data[1] =
            makeDestIPAddress( );
            inBuff[inIdx].pkt.data[2] =
            chooseInt( ).remainder(4);
        ...
    } else { // setup data packet
    ...} } }
```

COSE was able to detect the path condition PCport, (inBuff[inIdx].pkt. data[0]=CTRL PKT) AND (inBuff[inIdx]. pkt. data[2] ¿ 4). COSE propagated the PCport condition, through the InputIfc interface, to SFUpdateTablesProc and then annotated all the LookupTableIfc interfaces with lookupTable[tableIdx].outputPort ¿ 4. COSE propagated the latter PC to SFPerformTransferProc and annotated the only block of code that writes to the output ports with it. With the annotation listed below in Table 3, COSE enabled the synthesizer to drop the 4 output ports that are never written to or validated.

TABLE 3

```
if(outPortIdx < 4){ // COSE ANNOTATION
    outBuff.[outPortIdx].valid = 1;
    outBuff.[outPortIdx].pkt = getPcktFromScheduleAndMemory( );
    ... } // END COSE ANNOTATION
```

Figure 8:
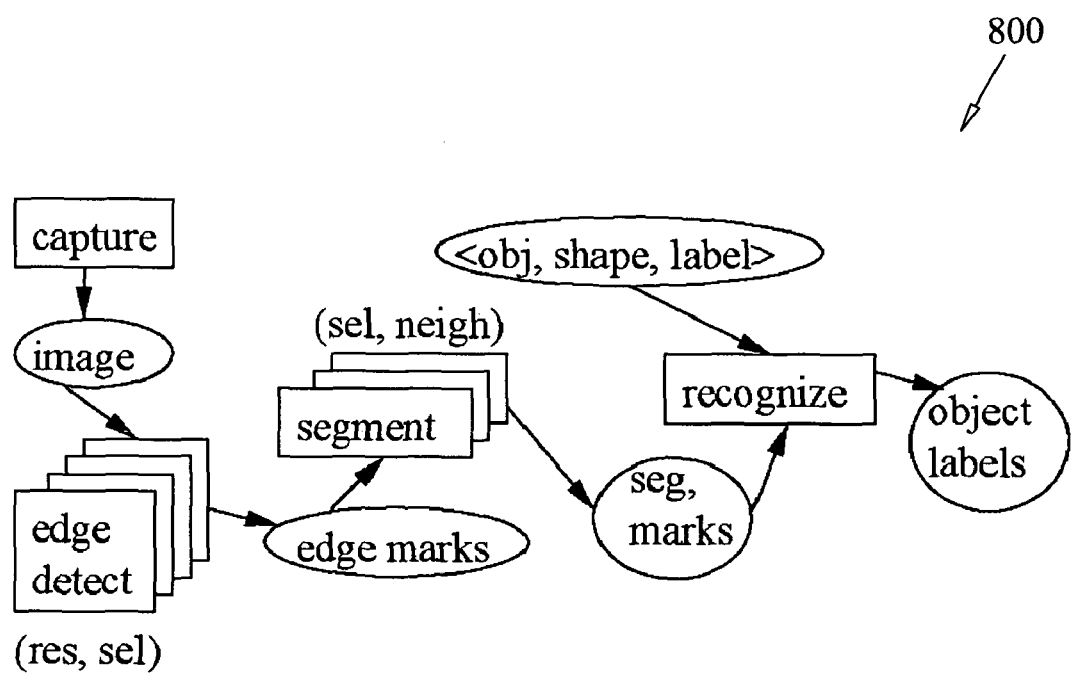
FIG. 8 illustrates a high-level representation of an image processing video surveillance application.

Turning now to FIG. 8, illustrated is a high-level representation of an image processing video surveillance application 800. Generally, the image processing video surveillance application 800, also called object identification (ObjectID), accepts an image and produces labels of the objects with their coordinates in the image. One or more edge detectors scan the image and produce edge marks that are visited by one or more segmentation algorithms to produce, segmentation marks. The segmentation marks partition the image with the borders of the main shapes in it. Next, a pattern recognition algorithm is utilized to match the shapes in the segmented image to a library of objects. The image processing video surveillance application 800 instantiates 4 edge detectors and 3 segmentors and employs them depending on the resolution of the requested edge and recognition. It is assumed that the system was designed for applications that require high resolution analysis, e.g. military applications. Where lower resolutions are suitable, such as for use in home surveillance, just two detectors and one segmentor are typically needed.

Figure 9:
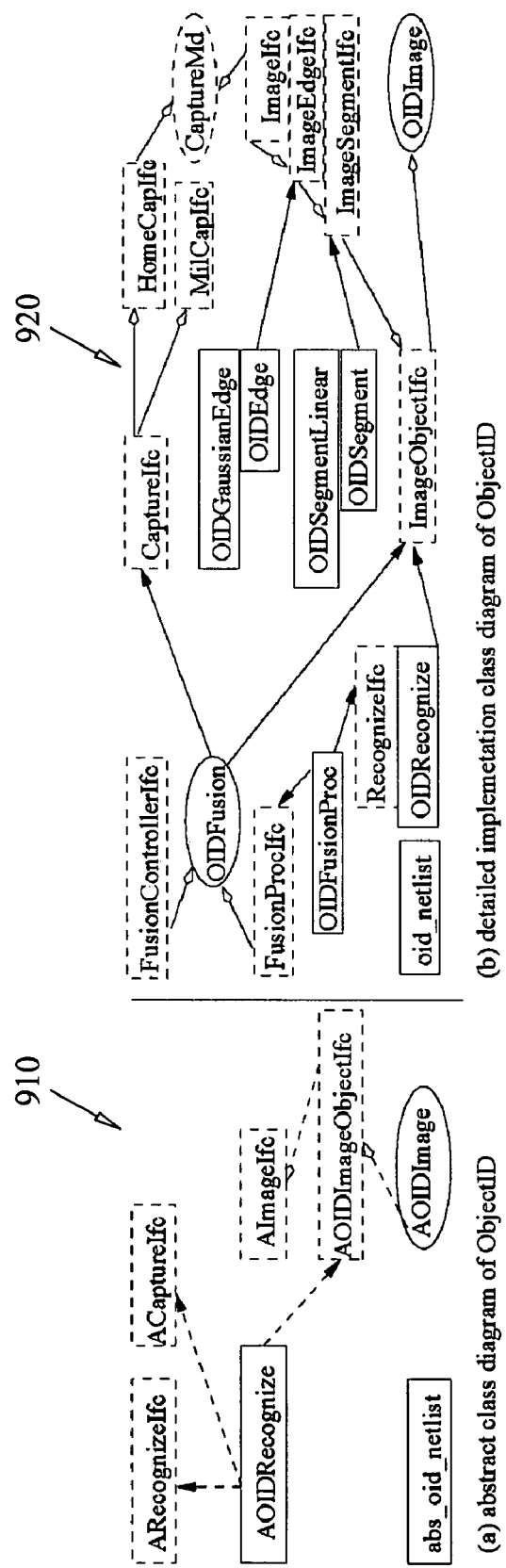
FIG. 9 illustrates the levels of abstraction of the image processing video surveillance application.

Referring now to FIG. 9, with continuing reference to FIG. 8, there is depicted the levels of abstraction of the image processing video surveillance application 800. More particularly, FIG. 9(a) illustrates an abstract class diagram 910 of the ObjectID application and FIG. 9(b) shows the detailed implementation class diagram 920 of the ObjectID application. As with FIG. 7 above, boxes denote process classes, dotted boxes denote interfaces, ellipses show media classes, and filled and empty arrows denote ownership and inheritance relations respectively.

MMM Model for ObjectID: An OIDImage media implements OIDImageObjectIfc which defines interfaces for object identification and inherits image, edge, and segment interfaces. An OIDEdge process accesses the OIDZImage media through owning a port of type ImageEdgeIfc. OIDGaussianEdge extends the OIDEdge process and implements one type of edge detectors that utilizes a Gaussian mask to differentiate pixels. For ease of explanation, only one type of edge detectors is named. Other well known techniques for edge detection such as the Sobel, Prewitt, Laplacian of Guassian (LoG), and the Canny detectors may also be advantageously employed. Similarly to OIDEdge, OIDSegment owns a port of type ImageSegmentIfc, and OIDSegmentLinear implements one type of segmentation algorithms. An OIDFusion medium owns a CaptureIfc and an ImageObjectIfc and it also implements a FusionControllerIfc and FusionProcIfc interfaces. OIDFusionProc owns FusionProcIfc and RecognizeIfc interfaces and a OIDRecognize process also owns similar interfaces. A netlist oid_netlist instantiates 4 OIDGaussionEdge processes, 2 OIDSegmentLinear processes, one OIDimage medium, one OIDFusion medium, and one OIDFusionProc process. It also connects them appropriately through their owned and implemented ports. CaptureIfc and the object part of ImageObjectIfc are open to the outside world where the system can accept controlled input.

Turning now to FIG. 10, there is illustrated an exemplary code listing 1000 for the ObjectID netlist, OIDFusion medium, and OIDGaussianEdge process described above and their dependency map. As depicted, an arrow on a connect method call in the netlist constructor links the usage of the oid fusion ifc port to its implementation in OIDFusion. If capture and recognition interfaces happen to be set, for example to 120 and 105, respectively, then the body of the thread method of the OIDGaussianEdge detectors instantiated as edge3 and edge4 will be dead code since the first statement in the condition is going to always be false. The arrows depicted in FIG. 10 illustrate how the dependency map was built from instantiations and connections in the netlist and usages of ports in process classes.

COSE ObjectID Results: In the image processing video surveillance application 800 described previously, a capture medium implementation that requires a low resolution was assumed. Infeasible PCs were detected on lines that activate the two high resolution edge detectors in one COSE iteration. In the second iteration and after propagating the infeasible PCs, COSE was also able to detect dead code for the lines that activate one of the segmentation processes. COSE was able to reduce the system by 2 edge detector components and one segmentation component.

The description of the present invention has been presented for purposes of illustration and description, and is not intended to be exhaustive or limited to the invention in the form disclosed. Many modifications and variations will be apparent to those of ordinary skill in the art. The embodiments were chosen and described hereinabove in order to best explain the principles of the invention, the practical application, and to enable others of ordinary skill in the art to understand the invention for various embodiments with various modifications as are suited to the particular use contemplated.

What is claimed is:

1. A method, in a computer, for minimizing hardware components within an embedded design having a plurality of hardware and software components, wherein each of the plurality of hardware and software components includes a plurality of component structures; the method comprising:
    the computer loading a co-optimization utilizing symbolic execution (COSE) logic module from system memory;
    a processor of the computer executing the COSE logic module to utilize symbolic execution to analyze the plurality of software components to define a limited set of values that the plurality of software components provide to the plurality of hardware components as constraints, the utilizing symbolic execution comprising:
        selecting, for each of the plurality of software components, substantially all possible paths of execution specifying a hardware component;
        accumulating a plurality of path conditions, wherein each of the plurality of path conditions is associated with a corresponding branch of code specifying the hardware component and comprises a conjunction of conditions over input and state variables required for the branch of code to execute;
        annotating each of the plurality of path conditions to the corresponding branch of code specifying the hardware component; and
        providing the annotated branches of code to a design synthesis tool implemented within the computer; and
    the design synthesis tool employing the provided annotated branches of code to reduce the plurality of component structures of the hardware component to optimize the embedded design.

2. The method as recited in claim 1, wherein the employing the provided annotated branches of code comprises utilizing a static analysis technique.

3. The method as recited in claim 1, wherein the design synthesis tool is Metropolis.

4. The method as recited in claim 1, wherein the utilizing symbolic execution further comprises propagating the plurality of path conditions to another one of the plurality of hardware modules connected to the hardware module.

5. The method as recited in claim 1, wherein the plurality of path conditions define the constraints that limit a set of values that the plurality of software modules provide to the plurality of hardware modules.

6. The method as recited in claim 1, wherein the utilizing symbolic execution further comprises, in response to detection of a plurality of path conditions restricting all indexes reading and writing into an array to a specific range, performing range restriction optimizations, wherein the array is resized and a smaller number of bits are utilized for the indexes.

7. The method as recited in claim 1, wherein the utilizing symbolic execution further comprises checking for mutually exclusive blocks of code and, in response to detecting two mutually exclusive blocks of code, adding a constraint to a netlist connecting the two blocks of code to declare that the two blocks of code are mutually exclusive.

8. A system for minimizing hardware components within an embedded design having a plurality of hardware and software components, wherein each of the plurality of hardware and software components includes a plurality of component structures, the system comprising:
    processor; and
    a system memory coupled to the processor,
    wherein the system memory stores a co-optimizing utilizing symbolic execution (COSE) module such that when the processor loads the COSE module from system memory and executes the COSE module the COSE module causes the processor to utilize symbolic execution to analyze the plurality of software components to define a limited set of values that the plurality of software components provide to the plurality of hardware components as constraints, the COSE module comprising:
- a selection module that, for each of the plurality of software components, explores substantially all possible paths of execution specifying a hardware component;
- an accumulation module that accumulates a plurality of path conditions, wherein each of the plurality of path conditions is associated with a corresponding branch of code specifying the hardware component and comprises a conjunction of conditions over input and state variables required for the branch of code to execute; and
- an optimizing module that annotates each of the plurality of path conditions to the corresponding branch of code specifying the hardware component; and a design synthesis tool implemented within the computer that utilizes the annotated branches of code to reduce the plurality of component structures of the hardware component to optimize the embedded design.

9. The system as recited in claim 8, wherein the COSE module utilizes symbolic execution.

10. The system as recited in claim 8, wherein the design synthesis tool utilizes a static analysis technique to reduce the plurality of component structures of the hardware component.

11. The system as recited in claim 8, wherein the design synthesis tool is Metropolis.

12. The system as recited in claim 8, wherein the COSE module further comprises a propagation module that propagates the plurality of path conditions to another one of the plurality of hardware modules connected to the hardware module.

13. The system as recited in claim 8, wherein the COSE module performs range restriction optimizations in response to detecting a plurality of path conditions restricting all indexes reading and writing into an array to a specific range, wherein the array is resized and a smaller number of bits are utilized for the indexes.

14. The system as recited in claim 8, wherein the COSE module checks for mutually exclusive blocks of code and, in response to detecting two mutually exclusive blocks of code, adding a constraint to a netlist connecting the two blocks of code to declare that the two blocks of code are mutually-exclusive.

15. A non-transitory computer-readable storage medium having stored thereon computer-executable instructions for minimizing hardware components within an embedded design having a plurality of hardware and software components, wherein each of the plurality of hardware and software components includes a plurality of component structures, the computer-executable instructions, when executed by a computer, performing a method comprising:
utilizing symbolic execution to analyze the software components to define a limited set of values that the plurality of software components provide, to the plurality of hardware components as constraints, the utilizing symbolic execution comprising:
- selecting, for each of the plurality of software components, substantially, all possible paths of execution specifying a hardware component;
- accumulating a plurality of path conditions, wherein each of the plurality of path conditions is associated with a corresponding branch of code specifying the hardware component and comprises a conjunction of conditions over input and state variables required for the branch of code to execute; and
- annotating each of the plurality of path conditions to the corresponding branch of code specifying the hardware component; and providing the annotated branches of code to a design synthesis tool, implemented within the computer, that utilizes the annotated branches of code to reduce the plurality of component structures of the hardware component to optimize the embedded design.

16. The computer-readable storage medium as recited in claim 15, wherein the providing the annotated branches of code comprises utilizing a static analysis technique.

17. The computer-readable storage medium as recited in claim 15, wherein the design synthesis tool is Metropolis.

18. The computer-readable storage medium as recited in claim 15, wherein the utilizing symbolic execution further comprises propagating the plurality of path conditions to another one of the plurality of hardware modules connected to the hardware module.

19. The computer-readable storage medium as recited in claim 15, wherein the utilizing symbolic execution further comprises, in response to detection of a plurality of path conditions restricting all indexes reading and writing into an array to a specific range, performing range restriction optimizations, wherein the array is resized and a smaller number of bits are utilized for the indexes.

20. The computer-readable storage medium as recited in claim 15, wherein the utilizing symbolic execution further comprises checking for mutually exclusive blocks of code and, in response to detecting two mutually exclusive blocks of code, adding a constraint to a netlist connecting the two blocks of code to declare that the two blocks of code are mutually exclusive.

* * * * *